Sept. 27, 1966        O. DANIEL        3,274,970

NON-CLOGGING WATER INTAKE FOR WATER VESSELS

Filed Oct. 23, 1964        3 Sheets-Sheet 1

INVENTOR
Otton DANIEL

BY

ATTORNEYS

INVENTOR
Otton DANIEL
BY
ATTORNEYS

Sept. 27, 1966 O. DANIEL 3,274,970
NON-CLOGGING WATER INTAKE FOR WATER VESSELS
Filed Oct. 23, 1964 3 Sheets-Sheet 3

INVENTOR
Otton DANIEL
BY
ATTORNEYS

United States Patent Office 3,274,970
Patented Sept. 27, 1966

3,274,970
NON-CLOGGING WATER INTAKE FOR
WATER VESSELS
Otton Daniel, 2860 Darling Place, Montreal,
Quebec, Canada
Filed Oct. 23, 1964, Ser. No. 406,117
6 Claims. (Cl. 115—.5)

The present invention generally relates to water intakes for water vessels intended to provide the necessary water for cooling various machines used in the power plant of the vessel.

More specifically, the invention relates to an additional water intake which is to be used whenever the vessel travels in water containing ground ice or frazil which often clogs conventional intakes.

With the increase of intercontinental trading by water vessels, as well as for other economic reasons, winter navigation, particularly in inland waters, has become more and more important in the latter years and there is clear indication that in the near future, most of inland waterways will be kept open the year round. However, even if the channels of inland waterways are artificially kept open during the winter, this does not prevent the formation of ground ice, better known as frazil, in suspension in the water. On the other hand, the cooling water intake necessary for the cooling of various machines in the engine room of the vessel is located, for design purposes, generally centrally of the vessel, and in an area which is relatively free of turbulence even though the vessel is moving and consequently the intake will often become clogged by this ground ice or frazil thus rendering it practically useless. This is particularly true during periods of severe cold. Now, if cooling water is not available, the whole propelling as well as other machinery that need to be cooled is useless and the vessel has to be stopped and anchored until milder weather sets, when the freezing and clogging conditions have passed. Even with the coming of milder temperature, it is necessary to remove any clogging ice which has formed and which does not rapidly melt.

It is consequently a main purpose of this invention to provide means whereby a constant supply of water is available practically at all times for cooling purposes and this, regardless of temperature conditions.

A further object of the invention resides in the provision of a water intake, preferably in combination with a conventional water intake, set at a location of great turbulence whereby ground ice or frazil will not tend to stick and build up on the intake screen to thus prevent water from being drawn in.

Still a further object of the invention resides in the provision of intake means for cooling water for use on a water vessel having a propellor screw and a stern portion leading to the screw, the combination comprising a water box in the stern portion adjacent the screw; the box being disposed below the water line of the vessel and in the area of turbulence created by the screw, the box further having an opening facing outwardly of the stern portion; screen means across the opening to allow water into the box and water tap means connected to the box in the stern portion to draw water from the box.

In another embodiment of the invention, a water compartment is provided in the stern portion of the vessel, and the water box is disposed in this water compartment with means to discharge the water from the water box into this compartment while the water tap means interconnects the compartment and a pump which is used to draw the water. Thus, water is actually drawn from the compartment rather than directly from the water box.

In a still further embodiment of the invention, the combination includes both systems which can be used alternatively. In that case, the water compartment may be dried out and used as a storing area.

As an added feature of the invention, a steam line means is connected to the water box for use in extreme cases where it is noted that water inflow may be hindered somewhat by the presence of too much ground ice, even in the turbulence area mentioned above.

It is believed that a better understanding of the invention will be afforded by the description that follows, having reference to the appended drawing wherein.

Figure 1:
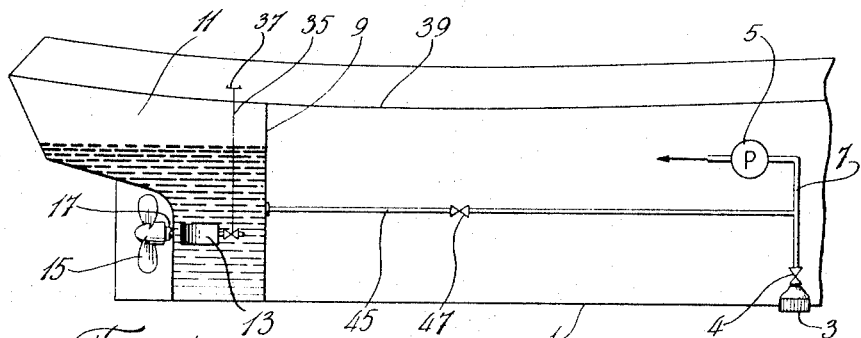
FIGURE 1 is a vertical cross-sectional view of the stern portion of a ship equipped with a supplementary water intake made according to the invention.
Figure 2:
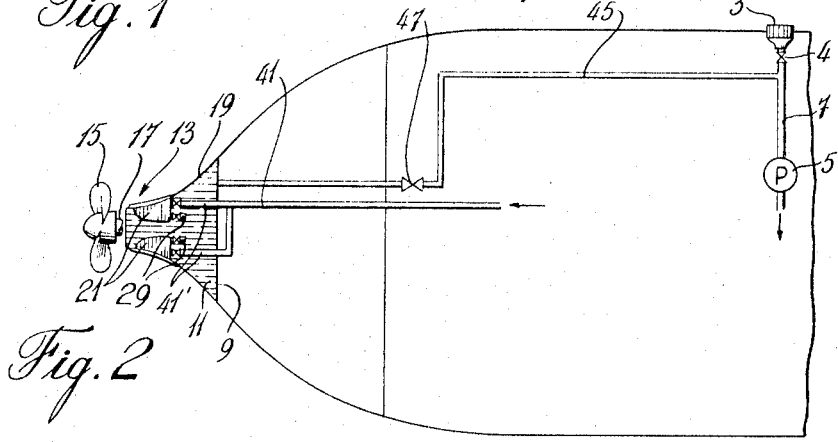
FIGURE 2 is a horizontal cross-sectional view of a vessel similar to that of FIGURE 1.
Figure 3:
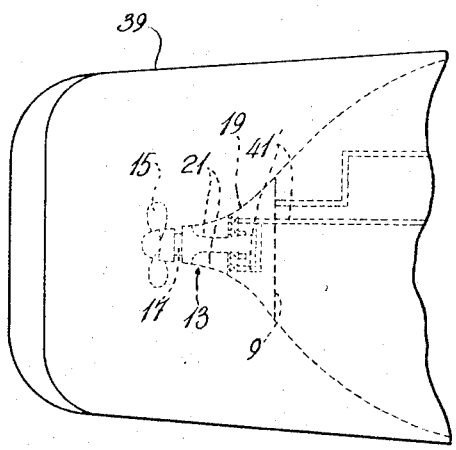
FIGURE 3 is a plan view of the stern portion of the vessel of FIGURES 1 and 2.
Figure 4:
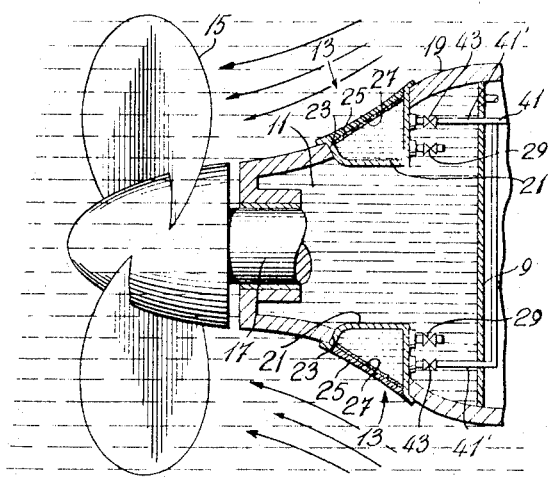
FIGURE 4 is a horizontal cross-sectional view, on an enlarged scale, of the water compartment of the invention.

As shown in FIG. 1, the invention is applicable to the stern portion 1 of a vessel having a conventional water intake 3 connected to a pump 5 means of a conduit 7, flow control being had by means of a valve 4.

The stern end of the vessel has a transverse bulkhead 9 defining a rear end compartment 11 within which is provided the water intake 13 of the invention.

As is conventional, the water vessel has a propelling screw 15 at the end of a shaft 17 mounted in the stern portion of vessel 1 or more specifically at the extreme end of a narrowing-down part 19 of the stern portion 1 which may thus be said to lead to the said screw 15.

Figure 7:
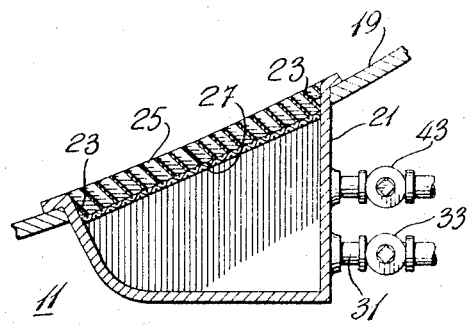
FIGURE 7 is a cross-sectional view, on an enlarged scale, through a water box of the invention.

A water box 21 is provided in stern portion 1 and more specifically in compartment 11, preferably on both the port and the starboard sides of the stern. This box or casing 21 (see FIG. 7) projects inwardly of stern portion or compartment 11, below the water line of the vessel, as close as possible to screw 15 or at least within the turbulence area created by the rotation of screw 15.

Box 21 has an opening 23 facing outwardly of compartment 11 and a screw means is mounted across opening 23 to allow water in box 21. The screen means may preferably be formed of a system of louvers 25 inwardly of which and thereagainst is mounted a screen 27.

Conduit means 29 is provided on a wall of box 21 and may consist of a nipple 31 opening into box 21 and a control valve 33 to which is operatively coupled a leader rod 35 extending upwardly through stern deck 39 and provided, at the upper end thereof, with an operating handle 37.

As mentioned previously, an important object of the invention is to provide this water intake as close as possible to screw 15 or at least in the area of turbulence created thereby. By so positioning intake 13, any ground ice or frazil that may happen to be in that area will be in such a state of turbulence that it will not have a tendency to cling to the screen means 25, 27. The installation will be able to withstand low weather conditions, but under these adverse conditions, if the speed of the vessel is reduced substantially, the screw rotational speed will of course also be substantially reduced and the turbulence may not be such as to prevent at least a certain amount of ice formation on the screen means. Because of the possibility of both the adverse conditions happening simultaneously, it is proposed to add a steamline 41 branching out into steam pipes 41' servicing both water boxes 21. Any standard valves 43 may be used to cut off supply of steam selectively to boxes 21.

Water tap means in the form of pipe 45, is connected to bulkhead 9 and branch pipe 7 leading to pump 5. A valve 47 controls the flow of water through the said pipe 45.

With the above arrangement, it will be understood that water is first admitted into boxes 21 to thereafter discharge into compartment 11 by means of discharge conduit means 29. Whenever the conventional water intake 3 becomes clogged by ice, water tap means valve 47 can be opened and pump 5 actuated. This will draw water out from compartment 11. Normally, valve 47 remains open all water long.

Water in compartment 11 has a reservoir action in the should screen means 25, 27 become partially clogged, thus requiring defrosting, water may in the meantime be drawn solely from compartment 11. At that time, nipples 31 are closed by valves 33 by operation of handles 37 and steam is injected into boxes 21 to defrost the screen means. When it is believed that enough steam has been sent in, and water flow is resumed, valve 43 are closed.

Figure 5:
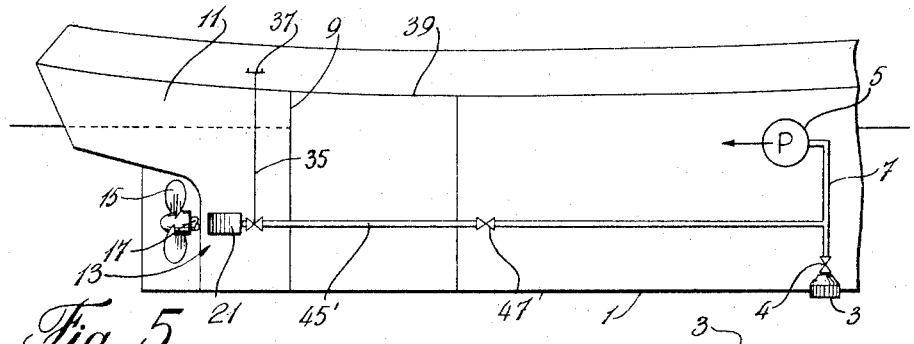
FIGURE 5 is a vertical cross-sectional view of a water intake system according to a second embodiment of the invention.
Figure 6:
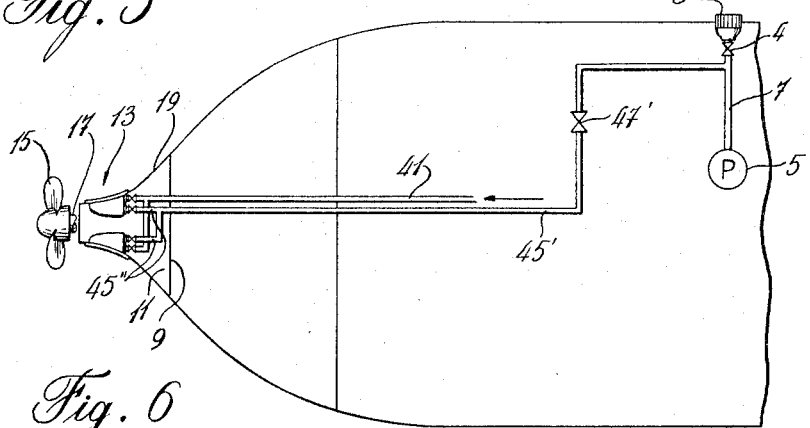
FIGURE 6 is a horizontal cross-sectional view of this second embodiment.
Figure 8:
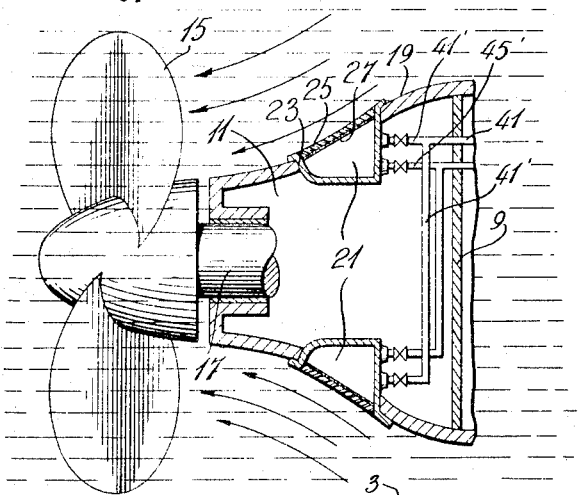
FIGURE 8 is a horizontal cross-sectional view, on an enlarged scale, of a water compartment according to this second embodiment of the invention.

From the above explanation, it will be understood that the presence of water in compartment 11 may not be entirely necessary and this space may be used for storage purposes. This is the situation of FIGS. 5, 6 and 8, wherein compartment 11 is dry, and the water tap means 45' are connected directly to boxes 21 rather than to bulkhead 9 as in the previous embodiment. The steam arrangement 41, 41' remains, however, the same but in this instance branches 41' may be located entirely inside compartment 11 since there is now no water in that compartment.

It has been observed that with the system proposed by the instant invention, almost any adverse temperature condition to be encountered during winter navigation may be overcome insofar as water intake for cooling purposes is concerned.

Figure 9:
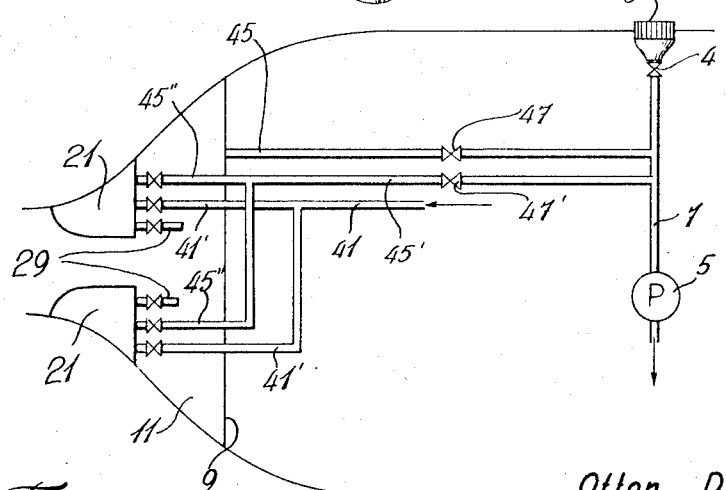
FIGURE 9 is a horizontal cross-sectional view of the stern portion of a vessel equipped with a secondary water intake according to a third embodiment of the invention.

FIG. 9 illustrates a stern portion equipped to operate under both the above described conditions; that is, either when compartment 11 is full of water in which case water tap means 45 including valve 47 is used, or compartment 11 is empty in which case water tap means 45', 45" with valve 47' are used.

I claim:
1. Non-clogging water intake means for water vessel having a propelling screw and a stern portion leading to said screw, the combination comprising:
 (a) means defining a water compartment in said stern portion;
 (b) a water box on each of the port and starboard sides of said stern portion in said compartment and adjacent said screw; said boxes disposed below the water line of said vessel in the area of turbulence created by said screw; each box having an opening facing outwardly of said water compartment;
 (c) a screen on each box across said opening to allow water into said boxes;
 (d) a pump in said vessel;
 (e) means to discharge water from said boxes into said compartment, and
 (f) water tap means interconnecting said compartment and pump to draw water from said compartment.

2. A combination as claimed in claim 1 with further tap means interconnecting said boxes and pump whereby water may selectively be tapped from said boxes and from said compartment.

3. A combination as claimed in claim 2 comprising a steam line connected to said box in said stern portion to discharge steam into said box.

4. Non-clogging water intake means for water vessel having a propelling screw and a stern portion leading to said screw, the combination comprising:
 (a) means defining a water compartment in said stern portion;
 (b) a water box in said compartment and stern portion; said box disposed below the water line of said vessel in the area of turbulence created by said screw and having an opening facing outwardly of said stern portion;
 (c) screen means across said opening to allow water into said box;
 (d) means to discharge water from said box into said compartment, and
 (e) water tap means connected to draw water out of said compartment.

5. In a water vessel, the combination comprising:
 (a) a narrowing down part at the stern end of said vessel defining a stern portion;
 (b) a shaft projecting rearwardly from the said vessel stern portion and a propelling screw mounted for rotation on said shaft adjacent said stern portion;
 (c) a frazil non-clogging intake means for water intended to cool machines of the power plant of said vessel, said means comprising:
  a water box in said stern portion adjacent said screw; said box disposed below the water line of said vessel and having an opening facing outwardly of said stern portion and in the area of turbulence created by said screw;
  screen means across said opening to allow water into said box;
 (d) a pump in said vessel, and
 (e) water tap means interconnecting said box and pump to draw water from said box.

6. A combination as claimed in claim 5 comprising a steam line connected to said box in said stern portion to discharge steam into said box.

References Cited by the Examiner
UNITED STATES PATENTS

| | | | |
|---|---|---|---|
| 1,196,849 | 9/1916 | Fowler | 115—0.5 |
| 1,762,957 | 6/1930 | Buehner | 115—17 |
| 2,350,598 | 6/1944 | Faville | 114—0.5 |

MILTON BUCHLER, *Primary Examiner.*

ANDREW H. FARRELL, *Examiner.*